(12) United States Patent
Matsubara et al.

(10) Patent No.: US 10,336,956 B2
(45) Date of Patent: Jul. 2, 2019

(54) NATURAL-GAS PURIFICATION APPARATUS

(71) Applicant: MITSUBISHI HEAVY INDUSTRIES, LTD., Tokyo (JP)

(72) Inventors: Wataru Matsubara, Tokyo (JP); Masayuki Eda, Houston, TX (US); Shintaro Honjo, Tokyo (JP); Susumu Okino, Tokyo (JP); Hiromi Nakatani, Tokyo (JP); Masaki Yushima, Hiroshima (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 63 days.

(21) Appl. No.: 15/475,929

(22) Filed: Mar. 31, 2017

(65) Prior Publication Data
US 2018/0283777 A1 Oct. 4, 2018

(51) Int. Cl.
*F25J 3/06* (2006.01)
*C10L 3/10* (2006.01)
*B01D 53/22* (2006.01)

(52) U.S. Cl.
CPC ............ *C10L 3/104* (2013.01); *B01D 53/226* (2013.01); *C10L 3/101* (2013.01); *B01D 2256/245* (2013.01); *B01D 2257/504* (2013.01); *C10L 2290/06* (2013.01); *C10L 2290/548* (2013.01); *C10L 2290/58* (2013.01); *C10L 2290/60* (2013.01); *Y02C 10/12* (2013.01)

(58) Field of Classification Search
CPC ...... F25J 3/0266; F25J 3/067; B01D 53/1475; B01D 53/1462; B01D 2257/504; B01D 2265/022
See application file for complete search history.

(56) References Cited

U.S. PATENT DOCUMENTS

| | | | | |
|---|---|---|---|---|
| 4,894,068 A | * | 1/1990 | Rice ................. | B01D 53/226 95/51 |
| 6,053,007 A | * | 4/2000 | Victory .............. | F25J 3/0209 62/619 |
| 2005/0092594 A1 | * | 5/2005 | Parro ................. | B01D 53/229 203/72 |
| 2012/0167620 A1 | * | 7/2012 | Van Dorst .......... | B01D 53/002 62/617 |

(Continued)

FOREIGN PATENT DOCUMENTS

| JP | 2009-113994 A | 5/2009 |
|---|---|---|
| JP | 2016-155987 A | 9/2016 |

*Primary Examiner* — Brian M King
(74) *Attorney, Agent, or Firm* — Westerman, Hattori, Daniel & Adrian, LLP

(57) ABSTRACT

A natural-gas purification apparatus includes: a compressor that adjusts the pressure of natural gas; a cooling unit that liquefies and separates a part of natural-gas liquid by cooling the natural gas after the pressure adjustment by the compressor; a heating unit that heats the natural gas after the separation of the part of the natural-gas liquid by the cooling unit; carbon-dioxide separation units that are arranged in series and separate carbon dioxide from the natural gas heated by the heating unit through carbon-dioxide separation membranes; and a thermostatic chamber that adjusts the temperature of at least the carbon-dioxide separation unit disposed at the most downstream side among the carbon-dioxide separation units.

7 Claims, 4 Drawing Sheets

(56) References Cited

U.S. PATENT DOCUMENTS

2014/0271450 A1\* 9/2014 Ishikawa ................. C22C 27/02
423/658.2
2017/0333833 A1\* 11/2017 Ota ........................ B01D 53/22

\* cited by examiner

NATURAL-GAS PURIFICATION APPARATUS

TECHNICAL FIELD

The present invention relates to a natural-gas purification apparatus for purifying natural gas from the ground or the like by separating carbon dioxide from the natural gas.

BACKGROUND ART

Natural gases discharged to the surface of the ground from high-temperature high-pressure underground areas such as oil and gas fields include: dry gases with one to two carbon atoms such as methane ($CH_4$) and ethane ($C_2H_6$), which are in gaseous form even at normal temperature and pressure; natural-gas liquids containing components with three to four carbon atoms such as propane ($C_3H_8$) and butane ($C_4H_{10}$), which are in gaseous form at normal temperature and pressure but are easily liquefied when pressurized or cooled, and components with five or more carbon atoms such as pentane ($C_5H_{12}$), which is in liquid form at normal temperature and pressure; and non-hydrocarbon gases such as carbon dioxide ($CO_2$).

As described in, for example, Patent Literature 1, such a natural gas is pressurized (to 0.5 to 2 MPa) by a compressor and cooled (to 0 to 20° C.) by a cooling unit to undergo gas-liquid separation in which a part of its natural-gas liquid is liquefied. The natural gas is then raised in temperature by being heated (to 50 to 80° C.) by a heating unit. Thereafter, the carbon dioxide is passed through a carbon-dioxide separation membrane to a lower pressure side, so that the carbon dioxide is separated and removed. As a result, the natural gas is purified.

CITATION LIST

Patent Literatures

{Patent Literature 1} Japanese Patent Application Publication No. 2016-155987
{Patent Literature 2} Japanese Patent Application Publication No. 2009-113994

SUMMARY OF INVENTION

Technical Problem

In the above system described in Patent Literature 1, in the separation and removal of carbon dioxide from natural gas, the carbon dioxide expands and therefore drops in temperature when passed through the carbon-dioxide separation membrane to the lower pressure side. Consequently, the carbon dioxide cools the carbon-dioxide separation membrane. As the carbon dioxide thus cools the carbon-dioxide separation membrane and lowers its temperature, a part of the remaining component of the natural-gas liquid is liquefied on the higher pressure side and covers the carbon-dioxide separation membrane. This might cause functional deterioration of the carbon-dioxide separation membrane.

Thus, in a conventional practice, devices such as the compressor, the cooling unit, and the heating unit are controlled according to the composition of the natural gas so as to maintain the carbon-dioxide separation membrane at higher temperature than the dew point (liquefaction temperature) of the remaining component of the natural-liquid gas while separating and removing carbon dioxide from the natural gas with the carbon-dioxide separation membrane. In this way, the generation of a liquid film on the higher pressure side is prevented, and therefore the functional deterioration of the carbon-dioxide separation membrane is prevented.

For these reason, the above-mentioned natural-gas purification apparatus has a problem that complicated control must be performed on devices according to the composition of the natural gas.

In view of the above, the present invention has been made to solve the above-mentioned problem, and an object thereof is to provide a natural-gas purification apparatus that does not require complicated control of devices.

Solution to Problem

A natural-gas purification apparatus according to a first aspect for solving the problem described above is a natural-gas purification apparatus for purifying natural gas by separating carbon dioxide from the natural gas, including: a pressure adjuster that adjusts a pressure of natural gas; a natural-gas-liquid separator that liquefies and separates a part of natural-gas liquid by cooling the natural gas after the pressure adjustment by the pressure adjuster; a heater that heats the natural gas after the separation of the part of the natural-gas liquid by the natural-gas-liquid separator; a plurality of carbon-dioxide separators that are arranged in series and separate carbon dioxide from the natural gas heated by the heater through carbon-dioxide separation membranes; and a temperature adjuster that adjusts a temperature of at least the carbon-dioxide separator disposed at a most downstream side among the plurality of carbon-dioxide separators.

A natural-gas purification apparatus according to a second aspect for solving the problem described above is the natural-gas purification apparatus according to the first aspect in which the temperature adjuster is a thermostatic chamber in which the carbon-dioxide separator is capable of being disposed.

A natural-gas purification apparatus according to a third aspect for solving the problem described above is the natural-gas purification apparatus according to the second aspect in which all of the plurality of carbon-dioxide separators are disposed in the thermostatic chamber that is a single thermostatic chamber.

A natural-gas purification apparatus according to a fourth aspect for solving the problem described above is the natural-gas purification apparatus according to the second aspect in which the plurality of carbon-dioxide separators are individually disposed in a plurality of the thermostatic chambers.

A natural-gas purification apparatus according to a fifth aspect for solving the problem described above is the natural-gas purification apparatus according to the first aspect in which the temperature adjuster is a heating unit.

A natural-gas purification apparatus according to a sixth aspect for solving the problem described above is the natural-gas purification apparatus according to the fifth aspect in which the heating unit is provided to each of the plurality of carbon-dioxide separators.

Advantageous Effect of Invention

According to the present invention, the natural-gas-liquid separator liquefies and separates a part of natural-gas liquid in natural gas, the carbon-dioxide separators separate and remove carbon dioxide in the natural gas, and the temperature adjuster adjusts the temperature of the carbon-dioxide separation membrane(s) so as to maintain the remaining part of the natural-gas liquid in gaseous form in the carbon-dioxide separator(s). This eliminates the need for complicated control of the pressure adjuster, the natural-gas-liquid separator, and the heater according to the composition of the natural gas, as in the conventional practice. Thus, it is possible to efficiently separate and remove carbon dioxide from the natural gas while preventing the generation of a liquid film over the carbon-dioxide separation membrane(s) of the carbon-dioxide separator(s).

DESCRIPTION OF EMBODIMENTS

Embodiments of a natural-gas purification apparatus according to the present invention will be described with reference to the drawings. It is to be noted that the present invention is not limited only to the following embodiments to be described with reference to the drawings.

First Embodiment

A natural-gas purification apparatus according to a first embodiment of the present invention will be described with reference to FIG. 1.

Figure 1:
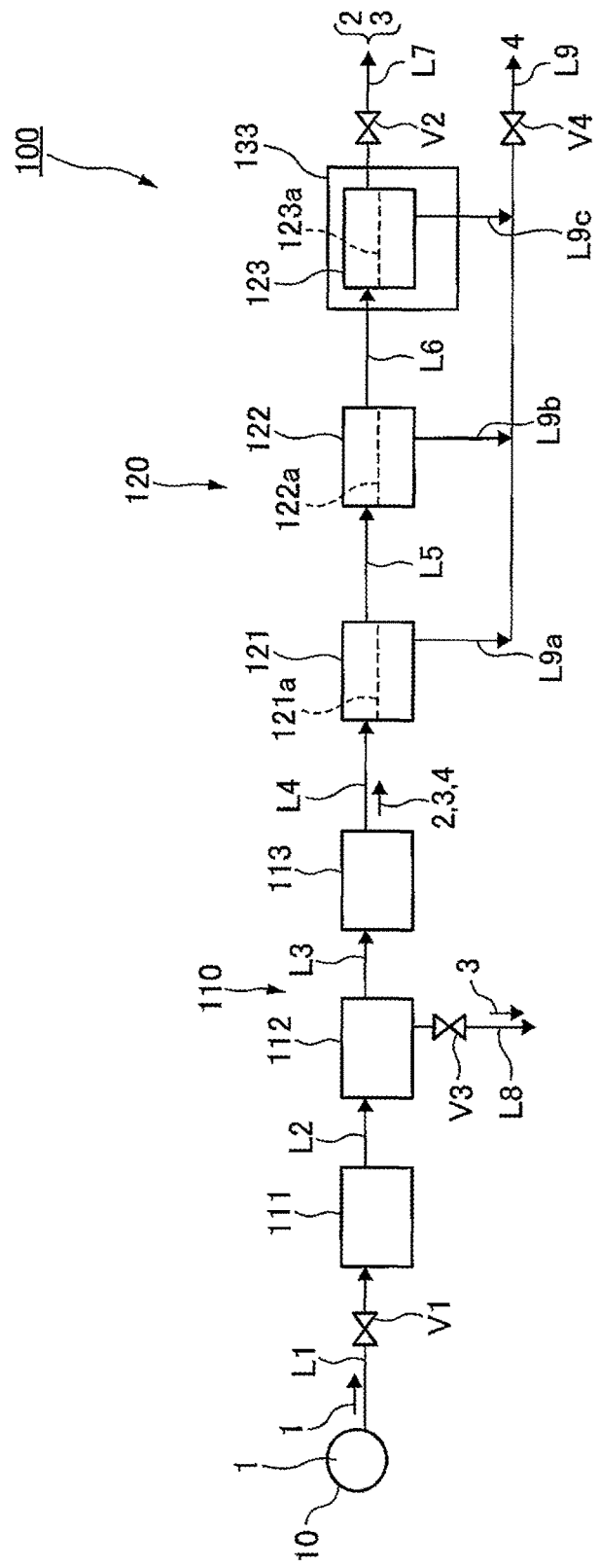
FIG. 1 illustrates a schematic configuration diagram of a natural-gas purification apparatus according to a first embodiment of the present invention.

As illustrated in FIG. 1, a natural-gas purification apparatus 100 according to this embodiment includes a carbon-dioxide-separation acceleration device (carbon-dioxide-separation accelerator) 110 and a carbon-dioxide separation device 120 connected in series to the carbon-dioxide-separation acceleration device 110.

The carbon-dioxide-separation acceleration device 110 includes a compressor (pressure adjuster) 111, a cooling unit (natural-gas-liquid separator) 112, and a heating unit (heater) 113. An inlet port of the compressor 111 is connectable to a natural-gas source 10 that discharges natural gas 1 from, for example, the ground by a gas supply pipe L1 provided with an on-off valve V1. An outlet port of the compressor 111 is connected to an inlet port of the cooling unit 112 by a gas supply pipe L2. A liquid outlet port of the cooling unit 112 communicates with the outside of the system through a liquid discharge pipe L8 provided with an on-off valve V3. A gas outlet port of the cooling unit 112 is connected to an inlet port of the heating unit 113 by a gas supply pipe L3. An outlet port of the heating unit 113 is connected to a gas inlet port of a first carbon-dioxide separation unit 121 in the carbon-dioxide separation device 120, which will be described below in detail, by a gas supply pipe L4.

The carbon-dioxide separation device 120 includes the first carbon-dioxide separation unit 121, a second carbon-dioxide separation unit 122, and a third carbon-dioxide separation unit 123. The first carbon-dioxide separation unit 121 includes a carbon-dioxide separation membrane 121a that separates carbon dioxide ($CO_2$) from gas. A post-separation-gas outlet port of the first carbon-dioxide separation unit 121 is connected to a gas inlet port of the second carbon-dioxide separation unit 122, which includes a carbon-dioxide separation membrane 122a that separates carbon dioxide ($CO_2$) from gas, by a gas supply pipe L5. A post-separation-gas outlet port of the second carbon-dioxide separation unit 122 is connected to a gas inlet port of the third carbon-dioxide separation unit 123, which includes a carbon-dioxide separation membrane 123a that separates carbon dioxide ($CO_2$) from gas, by a gas supply pipe L6. A post-separation-gas outlet port of the third carbon-dioxide separation unit 123 is connected to the outside of the system by a gas discharge pipe L7 provided with an on-off valve V2. A carbon-dioxide outlet port of the first carbon-dioxide separation unit 121 is connected to a first branched portion L9a of a carbon-dioxide discharge pipe L9. A carbon-dioxide outlet port of the second carbon-dioxide separation unit 122 is connected to a second branched portion L9b of the carbon-dioxide discharge pipe L9. A carbon-dioxide outlet port of the third carbon-dioxide separation unit 123 is connected to a third branched portion L9c of the carbon-dioxide discharge pipe L9. The distal end sides of the first branched portion L9a, the second branched portion L9b, and the third branched portion L9c are gathered and connected into a single carbon-dioxide discharge pipe L9. The distal end side of the carbon-dioxide discharge pipe L9 is connected to the outside of the system. The carbon-dioxide discharge pipe L9 is provided with an on-off valve V4.

For the carbon-dioxide separation membranes 121a to 123a, it is preferable to use membranes of cellulose acetate, polyimide, fluororesins, or the like with a withstand temperature of 50 C or lower, and more preferable to use membranes with a withstand temperature of 80 C or lower.

The above natural-gas purification apparatus 100 further includes a single thermostatic chamber (temperature adjuster) 133 capable of adjusting the temperature of the third carbon-dioxide separation unit 123 within a temperature range not higher than the withstand temperature of the carbon-dioxide separation membrane 123a (e.g. a maximum of approximately 80 C) but higher than the dew point of a remaining component of natural-gas liquid 3. Specifically, the third carbon-dioxide separation unit 123 is disposed inside a single thermostatic chamber 133. For example, an air thermostatic chamber designed to be heated by an electric heating element is usable as the thermostatic chamber 133. Thus, the carbon-dioxide separation membrane 123a of the third carbon-dioxide separation unit 123 can be held at higher temperature than the dew point (liquefaction temperature) of the remaining component of the natural-gas liquid 3.

In the above natural-gas purification apparatus 100, components such as the first to third carbon-dioxide separation units 121 to 123 constitute carbon-dioxide separators.

Next, a natural-gas purification method using the above natural-gas purification apparatus 100 according to this embodiment will be described.

First, the composition of the natural gas 1 from the natural-gas source 10 (the proportions of dry gas 2, the natural-gas liquid 3, carbon dioxide 4, and the like) is figured out in advance using analysis equipment such as a gas chromatograph (GC).

The actuation of the compressor 111, the cooling unit 112, the heating unit 113, and the thermostatic chamber 133 and the opening degrees of the on-off valves V1 to V4 are adjusted and controlled according to this composition of the natural gas 1. Meanwhile, the opening degrees of the on-off valves V1 to V4 may be adjusted and controlled automatically by an arithmetic control device (not illustrated) or manually by an operator.

Thus, the natural gas 1 supplied from the natural-gas source 10 is pressurized (to 0.5 to 2 MPa) by the compressor 111 and cooled (to 0 to 20 C) by the cooling unit 112, so that a part of the natural-gas liquid 3 is liquefied and discharged to the outside of the system through the liquid discharge pipe L8 and the on-off valve V3. On the other hand, the remaining gas (the dry gas 2, the remaining component of the natural-gas liquid 3, and the carbon dioxide 4) is heated (to 50 to 80° C.) by the heating unit 113 and then supplied to the carbon-dioxide separation units 121 to 123.

When the remaining natural gas 1 is supplied to the carbon-dioxide separation units 121 to 123, the carbon dioxide 4 in the natural gas 1 is moved through the carbon-dioxide separation membranes 121a to 123a to the lower pressure side (the carbon-dioxide flow side) and discharged to the outside of the system through the first to third branched portions L9a to L9c of the carbon-dioxide discharge pipe L9 and the on-off valve V4. On the other hand, the remaining gas (the dry gas 2 and the remaining component of the natural-gas liquid 3) is discharged to the outside of the system through the gas discharge pipe L7 and the on-off valve V2 without being liquefied, since the carbon-dioxide separation membrane 123a is held at higher temperature than the dew point (liquefaction temperature) of the remaining component of the natural-gas liquid 3 by the thermostatic chamber 133.

Here, even if conditions of the natural gas 1 from the natural-gas source 10 (e.g. temperature, pressure, composition, etc.) change to such an extent as to cause liquefaction of the remaining component of the natural-gas liquid 3 on the carbon-dioxide separation membrane 123a of the third carbon-dioxide separation unit 123, the thermostatic chamber 133 will hold the carbon-dioxide separation membrane 123a of the third carbon-dioxide separation unit 123 at such temperature as to maintain the remaining component of the natural-gas liquid 3 in gaseous form.

In this way, a part of the natural-gas liquid 3 is reliably separated, thereby lowering the dew point (liquefaction temperature), and the carbon dioxide 4 is reliably removed, so that the natural gas 1 is purified.

In sum, according to this embodiment, the cooling unit 112 liquefies and separates a part of the natural-gas liquid 3 in the natural gas 1, the carbon-dioxide separation units 121 to 123 separate and remove the carbon dioxide 4 in the natural gas 1, and the thermostatic chamber 133 adjusts the temperature of the carbon-dioxide separation membrane 123a so as to maintain the remaining component of the natural-gas liquid 3 in gaseous form in the carbon-dioxide separation unit 123. This eliminates the need for complicated control of the compressor, the cooling unit, and the heating unit according to the composition of the natural gas, as in the conventional practice. Thus, it is possible to efficiently separate and remove the carbon dioxide 4 from the natural gas 1 while preventing the generation of a liquid film over the carbon-dioxide separation membrane 123a of the carbon-dioxide separation unit 123.

Second Embodiment

A natural-gas purification apparatus according to a second embodiment of the present invention will be described with reference to FIG. 2.

In this embodiment, for the same reference signs as those in the above first embodiment, description overlapping the description in the above embodiment will be omitted by using the same reference signs as those used in the above embodiment.

Figure 2:
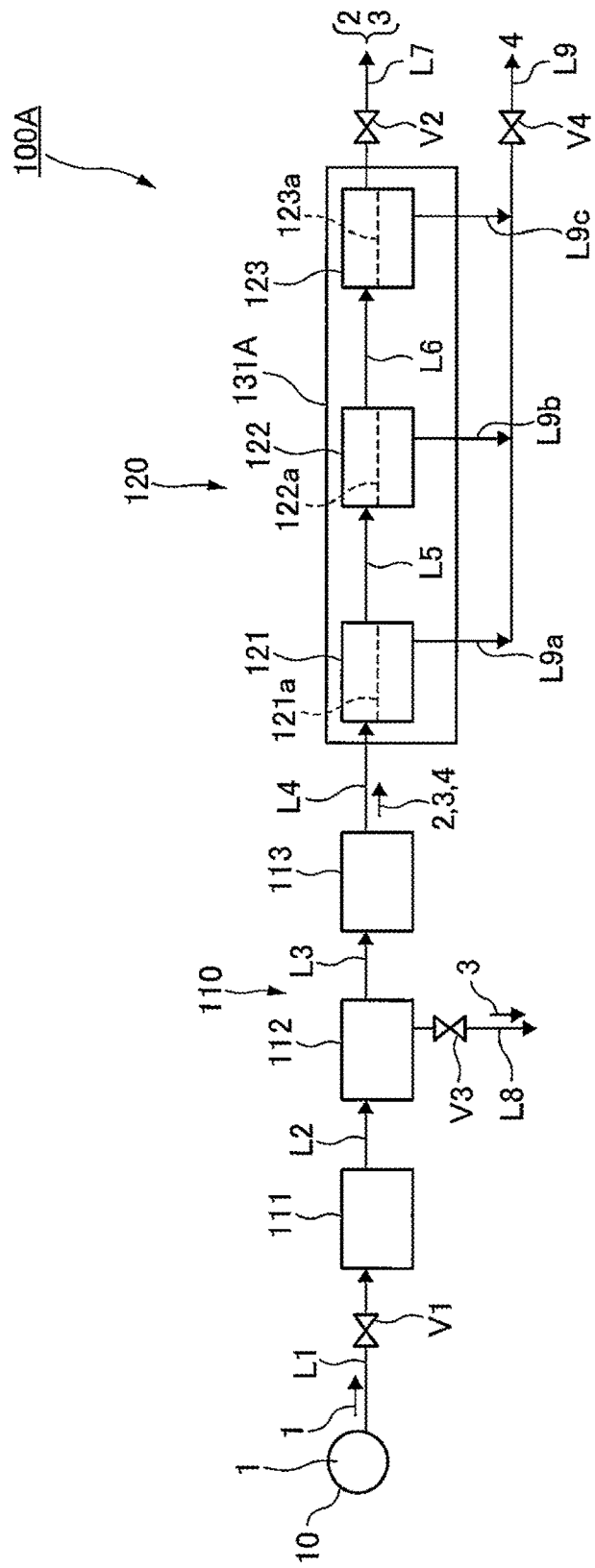
FIG. 2 illustrates a schematic configuration diagram of a natural-gas purification apparatus according to a second embodiment of the present invention.

As illustrated in FIG. 2, a natural-gas purification apparatus 100A according to this embodiment includes a single thermostatic chamber (temperature adjuster) 131A capable of adjusting the temperatures of the first to third carbon-dioxide separation units 121 to 123 within the temperature range not higher than the withstand temperatures of the carbon-dioxide separation membranes 121a to 123a (e.g. a maximum of approximately 80 C) but higher than the dew point of the remaining component of the natural-gas liquid 3. Specifically, the first to third carbon-dioxide separation units 121 to 123 are disposed inside a single thermostatic chamber 131A. For example, an air thermostatic chamber designed to be heated by an electric heating element is usable as the thermostatic chamber 131A, as in the thermostatic chamber 133. Thus, the carbon-dioxide separation membranes 121a to 123a of the first to third carbon-dioxide separation units 121 to 123 can be held at higher temperature than the dew point (liquefaction temperature) of the remaining component of the natural-gas liquid 3.

Next, a natural-gas purification method using the above natural-gas purification apparatus 100A according to this embodiment will be described.

As in the previous embodiment, the composition of the natural gas 1 (the proportions of the dry gas 2, the natural-gas liquid 3, the carbon dioxide 4, and the like) has been figured out in advance using analysis equipment such as a gas chromatograph (GC). The actuation of the compressor 111, the cooling unit 112, the heating unit 113, and the thermostatic chamber 131A and the opening degrees of the on-off valves V1 to V4 are adjusted and controlled according to this composition of the natural gas 1.

Thus, the natural gas 1 supplied from the natural-gas source 10 is pressurized (to 0.5 to 2 MPa) by the compressor 111 and cooled (to 0 to 20 C) by the cooling unit 112, so that a part of the natural-gas liquid 3 is liquefied and discharged to the outside of the system through the liquid discharge pipe L8 and the on-off valve V3. On the other hand, the remaining gas (the dry gas 2, the remaining component of the natural-gas liquid 3, and the carbon dioxide 4) is heated (to 50 to 80° C.) by the heating unit 113 and then supplied to the carbon-dioxide separation units 121 to 123.

When the remaining natural gas 1 is supplied to the carbon-dioxide separation units 121 to 123, the carbon dioxide 4 in the natural gas 1 is moved through the carbon-dioxide separation membranes 121a to 123a to the lower pressure side (the carbon-dioxide flow side) and discharged to the outside of the system through the first to third branched portions L9a to L9c of the carbon-dioxide discharge pipe L9 and the on-off valve V4. On the other hand, the remaining gas (the dry gas 2 and the remaining component of the natural-gas liquid 3) is discharged to the outside of the system through the gas discharge pipe L7 and the on-off valve V2 without being liquefied, since the carbon-dioxide separation membranes 121a to 123a are held at higher temperature than the dew point (liquefaction temperature) of the remaining component of the natural-gas liquid 3 by the thermostatic chamber 131A.

Here, even if conditions of the natural gas 1 from the natural-gas source 10 (e.g. temperature, pressure, composition, etc.) change to such an extent as to cause liquefaction of the remaining component of the natural-gas liquid 3 on the carbon-dioxide separation membranes 121a to 123a of the carbon-dioxide separation units 121 to 123, the thermostatic chamber 131A will hold the carbon-dioxide separation membranes 121a to 123a of the carbon-dioxide separation units 121 to 123 at such temperature as to maintain the remaining component of the natural-gas liquid 3 in gaseous form.

In this way, a part of the natural-gas liquid 3 is reliably separated, thereby lowering the dew point (liquefaction temperature), and the carbon dioxide 4 is reliably removed, so that the natural gas 1 is purified.

Thus, according to this embodiment, it is possible to efficiently separate and remove the carbon dioxide 4 from the natural gas 1 while reliably preventing the generation of a liquid film over the carbon-dioxide separation membranes 121a to 123a of the carbon-dioxide separation units 121 to 123, as in the previous embodiment.

Third Embodiment

A natural-gas purification apparatus according to a third embodiment of the present invention will be described with reference to FIG. 3.

In this embodiment, for the same components as those in the above first and second embodiments, description overlapping the description in the above embodiments will be omitted by using the same reference signs as those used in the above embodiments.

Figure 3:
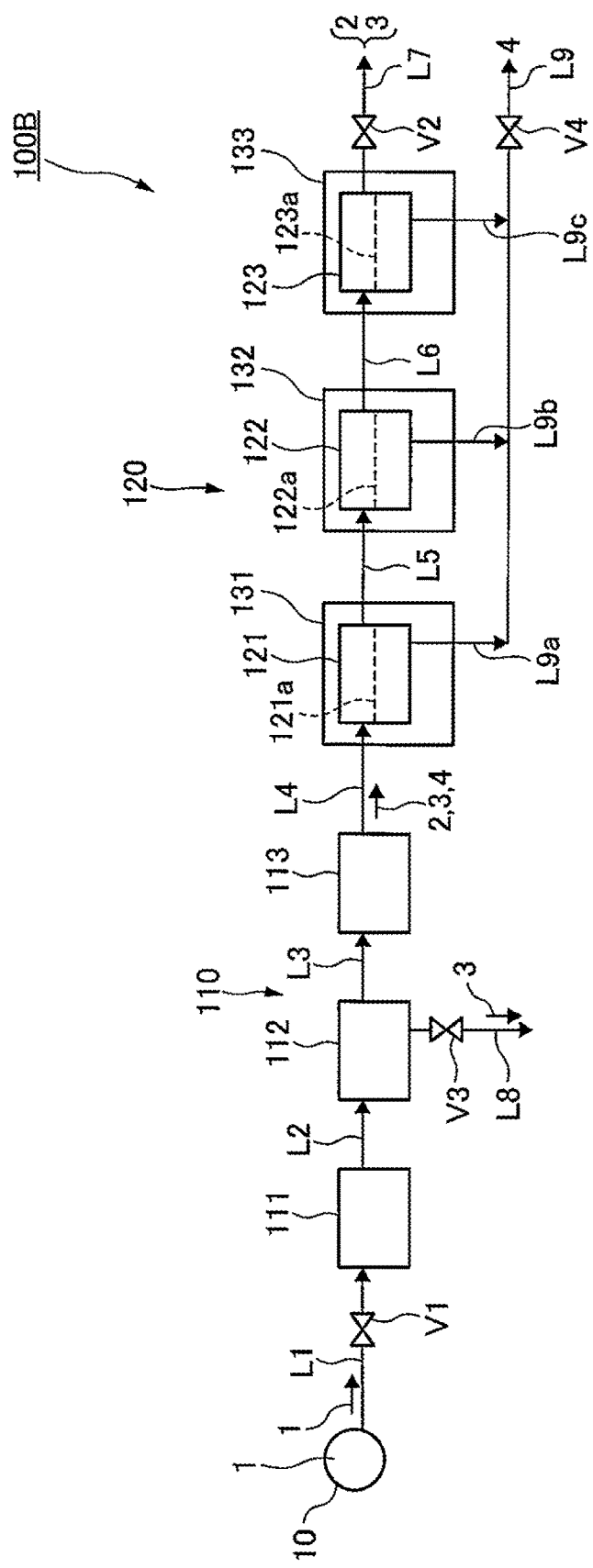
FIG. 3 illustrates a schematic configuration diagram of a natural-gas purification apparatus according to a third embodiment of the present invention.

As illustrated in FIG. 3, a natural-gas purification apparatus 100B according to this embodiment includes three thermostatic chambers (temperature adjusters) 131 to 133 capable of adjusting the temperatures of the first to third carbon-dioxide separation units 121 to 123 within the temperature range not higher than the withstand temperatures of the carbon-dioxide separation membranes 121a to 123a (e.g. a maximum of approximately 80 C) but higher than the dew point of the remaining component of the natural-gas liquid 3. Specifically, the first to third carbon-dioxide separation units 121 to 123 are disposed inside the thermostatic chambers 131 to 133, respectively. For example, air thermostatic chambers designed to be heated by electric heating elements are usable as the thermostatic chambers 131 to 133. Thus, the carbon-dioxide separation membranes 121a to 123a of the first to third carbon-dioxide separation units 121 to 123 can be held at higher temperature than the dew point (liquefaction temperature) of the remaining component of the natural-gas liquid 3.

Next, a natural-gas purification method using the above natural-gas purification apparatus 100B according to this embodiment will be described.

As in the previous embodiments, the composition of the natural gas 1 (the proportions of the dry gas 2, the natural-gas liquid 3, the carbon dioxide 4, and the like) has been figured out in advance using analysis equipment such as a gas chromatograph (GC). The actuation of the compressor 111, the cooling unit 112, the heating unit 113, and the thermostatic chambers 131 to 133 and the opening degrees of the on-off valves V1 to V4 are adjusted and controlled according to this composition of the natural gas 1.

Thus, the natural gas 1 supplied from the natural-gas source 10 is pressurized (to 0.5 to 2 MPa) by the compressor 111 and cooled (to 0 to 20 C) by the cooling unit 112, so that a part of the natural-gas liquid 3 is liquefied and discharged to the outside of the system through the liquid discharge pipe L8 and the on-off valve V3. On the other hand, the remaining gas (the dry gas 2, the remaining component of the natural-gas liquid 3, and the carbon dioxide 4) is heated (to 50 to 80° C.) by the heating unit 113 and then supplied to the carbon-dioxide separation units 121 to 123.

When the remaining natural gas 1 is supplied to the carbon-dioxide separation units 121 to 123, the carbon dioxide 4 in the natural gas 1 is moved through the carbon-dioxide separation membranes 121a to 123a to the lower pressure side (the carbon-dioxide flow side) and discharged to the outside of the system through the first to third branched portions L9a to L9c of the carbon-dioxide discharge pipe L9 and the on-off valve V4. On the other hand, the remaining gas (the dry gas 2 and the remaining component of the natural-gas liquid 3) is discharged to the outside of the system through the gas discharge pipe L7 and the on-off valve V2 without being liquefied, since the carbon-dioxide separation membranes 121a to 123a are held at higher temperature than the dew point (liquefaction temperature) of the remaining component of the natural-gas liquid 3 by the thermostatic chambers 131 to 133.

Here, even if conditions of the natural gas 1 from the natural-gas source 10 (e.g. temperature, pressure, composition, etc.) change to such an extent as to cause liquefaction of the remaining component of the natural-gas liquid 3 on any of the carbon-dioxide separation membranes 121a to 123a of the carbon-dioxide separation units 121 to 123, the thermostatic chambers 131 to 133 will hold the carbon-dioxide separation membranes 121a to 123a of the carbon-dioxide separation units 121 to 123 at such temperature as to maintain the remaining component of the natural-gas liquid 3 in gaseous form.

In this way, a part of the natural-gas liquid 3 is reliably separated, thereby lowering the dew point (liquefaction temperature), and the carbon dioxide 4 is reliably removed, so that the natural gas 1 is purified.

Thus, according to this embodiment, it is possible to efficiently separate and remove the carbon dioxide 4 from the natural gas 1 while more reliably preventing the generation of a liquid film over the carbon-dioxide separation membranes 121a to 123a of the carbon-dioxide separation units 121 to 123, as in the previous embodiments.

Fourth Embodiment

A natural-gas purification apparatus according to a fourth embodiment of the present invention will be described with reference to FIG. 4.

In this embodiment, for the same components as those in the above first to third embodiments, description overlapping the description in the above embodiments will be omitted by using the same reference signs as those used in the above embodiments.

Figure 4:
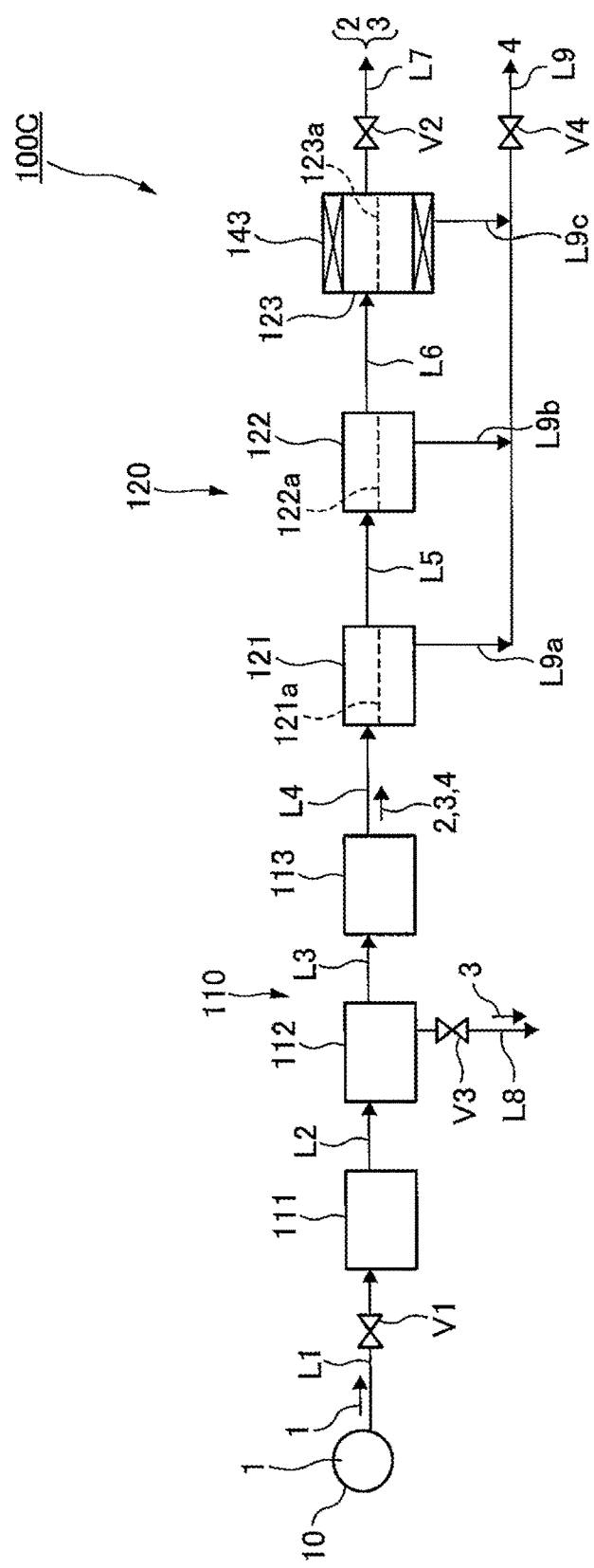
FIG. 4 illustrates a schematic configuration diagram of a natural-gas purification apparatus according to a fourth embodiment of the present invention.

As illustrated in FIG. 4, a natural-gas purification apparatus 100C according to this embodiment includes a heating unit (temperature adjuster) 143 capable of adjusting the temperature of the third carbon-dioxide separation unit 123 within the temperature range not higher than the withstand temperature of the carbon-dioxide separation membrane 123a (e.g. a maximum of approximately 80 C) but higher than the dew point of the remaining component of natural-gas liquid 3. Specifically, the third carbon-dioxide separation unit 123 is provided with the heating unit 143. For example, an electric heating element is usable as the heating unit 143. Thus, the carbon-dioxide separation membrane 123a of the third carbon-dioxide separation unit 123 can be held at higher temperature than the dew point (liquefaction temperature) of the remaining component of the natural-gas liquid 3.

Next, a natural-gas purification method using the above natural-gas purification apparatus 100C according to this embodiment will be described.

As in the previous embodiments, the composition of the natural gas 1 (the proportions of the dry gas 2, the natural-gas liquid 3, the carbon dioxide 4, and the like) has been figured out in advance using analysis equipment such as a gas chromatograph (GC). The actuation of the compressor 111, the cooling unit 112, the heating unit 113, and the heating unit 143 and the opening degrees of the on-off valves V1 to V4 are adjusted and controlled according to this composition of the natural gas 1.

Thus, the natural gas 1 supplied from the natural-gas source 10 is pressurized (to 0.5 to 2 MPa) by the compressor 111 and cooled (to 0 to 20 C) by the cooling unit 112, so that a part of the natural-gas liquid 3 is liquefied and discharged to the outside of the system through the liquid discharge pipe L8 and the on-off valve V3. On the other hand, the remaining gas (the dry gas 2, the remaining component of the natural-gas liquid 3, and the carbon dioxide 4) is heated (to 50 to 80° C.) by the heating unit 113 and then supplied to the carbon-dioxide separation units 121 to 123.

When the remaining natural gas 1 is supplied to the carbon-dioxide separation units 121 to 123, the carbon dioxide 4 in the natural gas 1 is moved through the carbon-dioxide separation membranes 121a to 123a to the lower pressure side (the carbon-dioxide flow side) and discharged to the outside of the system through the first to third branched portions L9a to L9c of the carbon-dioxide discharge pipe L9 and the on-off valve V4. On the other hand, the remaining gas (the dry gas 2 and the remaining component of the natural-gas liquid 3) is discharged to the outside of the system through the gas discharge pipe L7 and the on-off valve V2 without being liquefied, since the carbon-dioxide separation membrane 123a is held at higher temperature than the dew point (liquefaction temperature) of the remaining component of the natural-gas liquid 3 by the heating unit 143.

Here, even if conditions of the natural gas 1 from the natural-gas source 10 (e.g. temperature, pressure, composition, etc.) change to such an extent as to cause liquefaction of the remaining component of the natural-gas liquid 3 on the carbon-dioxide separation membrane 123a of the carbon-dioxide separation unit 123, the heating unit 143 will hold the carbon-dioxide separation membrane 123a of the carbon-dioxide separation unit 123 at such temperature as to maintain the remaining component of the natural-gas liquid 3 in gaseous form.

In this way, a part of the natural-gas liquid 3 is reliably separated, thereby lowering the dew point (liquefaction temperature), and the carbon dioxide 4 is reliably removed, so that the natural gas 1 is purified.

Thus, according to this embodiment, it is possible to efficiently separate and remove the carbon dioxide 4 from the natural gas 1 while reliably preventing the generation of a liquid film over the carbon-dioxide separation membrane 123a of the carbon-dioxide separation unit 123, as in the previous embodiments.

Other Embodiments

Note that the above description has been given using the natural-gas purification apparatuses 100, 100A, 100B, and 100C, which includes the three carbon-dioxide separation units 121 to 123. However, it is also possible to configure a natural-gas purification apparatus including four or more carbon-dioxide separation units.

The above description has been given using the natural-gas purification apparatus 100C, in which only the third carbon-dioxide separation unit 123 is provided with the heating unit 143. However, it is possible to configure a natural-gas purification apparatus in which the first and second carbon-dioxide separation units are also provided with heating units. Such a natural-gas purification apparatus can individually control the temperatures of the first to third carbon-dioxide separation units, as in the natural-gas purification apparatus 100B, and therefore efficiently separate and remove the carbon dioxide 4 from the natural gas 1 while more reliably preventing the generation of a liquid film over the first to third carbon-dioxide separation membranes.

REFERENCE SIGNS LIST

1 NATURAL GAS
2 DRY GAS
3 NATURAL-GAS LIQUID
4 CARBON DIOXIDE
10 NATURAL-GAS SOURCE
100, 100A, 100B, 100C NATURAL-GAS PURIFICATION APPARATUS
110 CARBON-DIOXIDE-SEPARATION ACCELERATION DEVICE
111 COMPRESSOR
112 COOLING UNIT
113 HEATING UNIT
120 CARBON-DIOXIDE SEPARATION DEVICE
121 FIRST CARBON-DIOXIDE SEPARATION UNIT
121a CARBON-DIOXIDE SEPARATION MEMBRANE
122 SECOND CARBON-DIOXIDE SEPARATION UNIT
122a CARBON-DIOXIDE SEPARATION MEMBRANE
123 THIRD CARBON-DIOXIDE SEPARATION UNIT
123a CARBON-DIOXIDE SEPARATION MEMBRANE
131, 131A THERMOSTATIC CHAMBER
132 THERMOSTATIC CHAMBER
133 THERMOSTATIC CHAMBER
143 HEATING ELEMENT (HEATING UNIT)
L1 TO L6 GAS SUPPLY PIPE
L7 GAS DISCHARGE PIPE
L8 LIQUID DISCHARGE PIPE
L9 CARBON-DIOXIDE DISCHARGE PIPE
V1 TO V4 ON-OFF VALVE

The invention claimed is:

1. A natural-gas purification apparatus for purifying natural gas by separating carbon dioxide from the natural gas, comprising:
  a natural-gas-liquid separator that liquefies and separates a part of natural-gas liquid by cooling the natural gas having an adjusted pressure;
  a heater that heats the natural gas after the separation of the part of the natural-gas liquid by the natural-gas-liquid separator;
  a plurality of carbon-dioxide separators that are arranged in series and separate carbon dioxide from the natural gas heated by the heater through carbon-dioxide separation membranes; and
  a thermostatic chamber in which at least the carbon-dioxide separator disposed at a most downstream side among the plurality of carbon-dioxide separators is disposed and which adjusts a temperature of the carbon-dioxide separator disposed in the thermostatic chamber to a temperature not higher than a withstand temperature of the carbon-dioxide separation membrane but higher than a dew point of a remaining component of the natural-gas liquid inside the carbon-dioxide separator, wherein the thermostatic chamber adjusts the temperature of the carbon-dioxide separator to the temperature higher than the dew point according to a composition of the natural gas figured out using analysis equipment.

2. The natural-gas purification apparatus according to claim 1, wherein all of the plurality of carbon-dioxide separators are disposed in the thermostatic chamber that is a single thermostatic chamber.

3. The natural-gas purification apparatus according to claim 1, wherein the plurality of carbon-dioxide separators are individually disposed in a plurality of the thermostatic chambers.

4. A natural-gas purification apparatus for purifying natural gas by separating carbon dioxide from the natural gas, comprising:

a natural-gas-liquid separator that liquefies and separates a part of natural-gas liquid by cooling the natural gas having an adjusted pressure;

a heater that heats the natural gas after the separation of the part of the natural-gas liquid by the natural-gas-liquid separator;

a plurality of carbon-dioxide separators that are arranged in series and separate carbon dioxide from the natural gas heated by the heater through carbon-dioxide separation membranes; and a heating unit which is provided to at least the carbon-dioxide separator disposed at a most downstream side among the plurality of carbon-dioxide separators and which adjusts a temperature of the carbon-dioxide separators and which adjusts a temperature of the carbon-dioxide separator provided with the heating unit to a temperature not higher than a withstand temperature of the carbon-dioxide separation membrane but higher than a dew point of a remaining component of the natural-gas liquid inside the carbon-dioxide separator, wherein the heating unit adjusts the temperature of the carbon-dioxide separator to the temperature higher than the dew point according to a composition of the natural gas figured out using analysis equipment.

5. The natural-gas purification apparatus according to claim 4, wherein the heating unit is provided to each of the plurality of carbon-dioxide separators.

6. The natural-gas purification apparatus according to claim 1, further comprising:

a pressure adjuster that adjusts the pressure of the natural gas.

7. The natural-gas purification apparatus according to claim 4, further comprising:

a pressure adjuster that adjusts the pressure of the natural gas.

* * * * *